United States Patent
Fujieda et al.

(10) Patent No.: US 7,437,070 B2
(45) Date of Patent: Oct. 14, 2008

(54) SUBMARINE OBSERVATION APPARATUS AND SUBMARINE OBSERVATION SYSTEM

(75) Inventors: Tasuku Fujieda, Tokyo (JP); Hideki Goto, Tokyo (JP); Kenichi Asakawa, Kanagawa (JP); Hitoshi Mikada, Kanagawa (JP); Katsuyoshi Kawaguchi, Kanagawa (JP)

(73) Assignees: Mitsubishi Denki Kabushiki Kaisha, Tokyo (JP); Japan Agency for Marine-Earth Science and Technology, Yokosuka-shi (JP)

( * ) Notice: Subject to any disclaimer, the term of this patent is extended or adjusted under 35 U.S.C. 154(b) by 540 days.

(21) Appl. No.: 11/060,568

(22) Filed: Feb. 18, 2005

(65) Prior Publication Data

US 2005/0259998 A1 Nov. 24, 2005

(30) Foreign Application Priority Data

May 20, 2004 (JP) .............................. 2004-150630

(51) Int. Cl.
*H04B 10/08* (2006.01)

(52) U.S. Cl. .............................. 398/31; 398/30; 398/33; 398/37; 398/181; 398/104; 398/105; 398/107; 398/173; 398/177; 398/79; 398/195; 398/174; 398/175; 398/176; 359/333; 359/341.1; 359/337; 359/341.3; 359/341.4

(58) Field of Classification Search ................. 398/173, 398/177, 181, 174, 175.31, 176.16, 6, 11, 398/115, 18, 33, 37, 31, 30, 79, 195, 104, 398/105, 107, 175, 176, 16, 15; 359/333, 359/341.1, 341.4, 337, 341.3

See application file for complete search history.

(56) References Cited

U.S. PATENT DOCUMENTS

| 5,535,037 | A  | * | 7/1996 | Yoneyama | ................ | 398/181 |
| 6,604,870 | B2 | * | 8/2003 | Hørlyck | ...................... | 398/82 |
| 7,103,275 | B2 | * | 9/2006 | Fujiwara | ..................... | 398/31 |
| 2005/0259264 | A1 | * | 11/2005 | Munehira et al. | ........... | 356/450 |

FOREIGN PATENT DOCUMENTS

JP         7-202804        8/1995

* cited by examiner

*Primary Examiner*—Hanh Phan
(74) *Attorney, Agent, or Firm*—Oblon, Spivak, McClelland, Maier & Neustadt, P.C.

(57) ABSTRACT

In each of a plurality of submarine observation apparatus (1 to n), a branching unit (63) branches fixed-wavelength light (λ1) from an incoming wavelength-multiplexed light signal. An observation signal modulating unit (64) modulates the intensity of the branched fixed-wavelength light (λ1) with observation information multiplexed by an observation signal multiplex unit (61). A combining unit (65) combines light signals (λ2) to (λn) passing through the branching unit (63) and the fixed-wavelength light (λ1a) modulated by the observation signal modulating unit (64) into a composite light signal, and outputs it to an optical fiber (12a). Therefore, in each of the plurality of submarine observation apparatus (1 to n), there is no necessity for providing a wavelength-division-multiplexing-transmission optical transmitter which requires high wavelength stability.

15 Claims, 3 Drawing Sheets

US 7,437,070 B2

SUBMARINE OBSERVATION APPARATUS AND SUBMARINE OBSERVATION SYSTEM

BACKGROUND OF THE INVENTION

1. Field of the Invention

The present invention relates to a submarine observation apparatus for and a submarine observation system for transmitting submarine observation data through a submarine optical cable.

2. Description of Related Art

In a prior art submarine observation system, land terminal equipment transmits a light signal modulated with control signals to a plurality of submarine observation apparatus, and each of the plurality of submarine observation apparatus carries out light-to-electric conversion of the incoming light signal using an optical receiver. Each of the plurality of submarine observation apparatus then multiplexes observation information about each of the plurality of submarine observation apparatus and an electric signal to which the received light signal has been light-to-electric converted into a multiplexed signal, and converts the multiplexed signal into a light signal and transmits the light signal to the next submarine observation apparatus using an optical transmitter. An optical fiber cable is looped back at an end thereof so that a light signal outputted from the last-state submarine observation apparatus is sent back to the land terminal equipment (refer to patent reference 1, for example).

[Patent reference 1] JP, 7-202804,A (see pp. 6 and FIG. 1)

In the prior art submarine observation system constructed as mentioned above, each of the plurality of submarine observation apparatus needs to include an optical receiver for light-to-electric converting all of an incoming light signal into an electric signal, and an optical transmitter for multiplexing observation information and the electric signal into a multiplexed signal and for electric-to-light converting the multiplexed signal into a light signal. Therefore, the scale and cost of each of the plurality of submarine observation apparatus increases. The increase in the scale of each of the plurality of submarine observation apparatus results in an increase in the consumed electric current and hence an increase in the temperature of the inside of the sealed housing of each of the plurality of submarine observation apparatus, which are detrimental to the reliability of the components and circuitry of each of the plurality of submarine observation apparatus.

In another prior art submarine observation system having a point-to-point structure in which an optical transceiver unit of land terminal equipment is placed opposite to an optical transceiver unit of each of a plurality of submarine observation apparatus byway of one submarine optical cable for transmission of observation information, when a new submarine observation apparatus is added to the system, it is necessary to also add a submarine optical cable having a length similar to those of existing submarine optical cables. Therefore, the submarine observation system cannot be easily expanded.

In another prior art submarine observation system using a wavelength division multiplexing transmission method of multiplexing two or more fixed-wavelength light signals into a single optical fiber so as to transmit observation information, although the above-mentioned problem associated with the expandability is solved, high wavelength stability is required of optical transceiver units for wavelength division multiplexing transmission. In order to achieve this high wavelength stability, circuit devices, such as a Peltier control unit (i.e., a unit for controlling the temperature of a corresponding device using an element for converting electric power into heat in order to stabilize the oscillation wavelength), and a wavelength locker (i.e., a unit for locking the oscillation wavelength to a desired wavelength by monitoring the oscillation wavelength of an optical transmitter and controlling a wavelength filter and the temperature of the device), are required. As a result, the scale and cost of each of the plurality of submarine observation apparatus increases. The increase in the scale of each of the plurality of submarine observation apparatus results in an increase in the consumed electric current and hence an increase in the temperature of the inside of the sealed housing of each of the plurality of submarine observation apparatus, which are detrimental to the reliability of the components and circuitry of each of the plurality of submarine observation apparatus.

SUMMARY OF THE INVENTION

The present invention is made in order to solve the above-mentioned problems, and it is therefore an object of the present invention to provide a high-reliability submarine observation apparatus in which any increase in the scale and cost thereof is suppressed, and a high-expandability submarine observation system that can use any one of various optical transmission methods.

In accordance with the present invention, there is provided a submarine observation apparatus including: an observation unit for observing a submarine environment; a first branching unit for branching fixed-wavelength light, which is assigned to the submarine observation apparatus, from a wavelength-multiplexed light signal inputted thereto; a modulating unit for modulating an intensity of the fixed-wavelength light branched by the first branching unit with observation information observed by the observation unit; and a combining unit for combining a wavelength-multiplexed light signal passing through the first branching unit and the fixed-wavelength light modulated by the modulating unit into a composite light signal, and for outputting the composite light signal.

According to the present invention, the submarine observation apparatus is so constructed as to modulate the intensity of a fixed-wavelength light signal inputted thereto with observation information, combine the fixed-wavelength light signal and a remaining wavelength-multiplexed light signal having different wavelengths into a composite light signal, and output it, so as to transmit the observation information to land terminal equipment. Therefore, there is no necessity for providing a wavelength-division-multiplexing-transmission optical transmitter which requires high wavelength stability to the submarine observation apparatus. As a result, any increase in the scale and cost of the submarine observation apparatus can be suppressed, and the reliability of the submarine observation apparatus can be improved.

In addition, there can be provided a submarine observation system having a plurality of submarine observation apparatus according to the present invention which are connected to land terminal equipment by way of a plurality of submarine optical fibers, the submarine observation system using a wavelength division multiplexing transmission method. Therefore, a new submarine observation apparatus can be easily added to the submarine observation system by additionally installing a unit for generating a light signal having a wavelength different from those of components included in a wavelength-multiplexed light signal generated by the land terminal equipment and for multiplexing this wavelength-multiplexed light signal and the generated light signal, and a unit for separating and demodulating a light signal having the same wavelength as the newly-generated light signal from a wavelength-multiplexed light signal sent back to the land terminal equipment to reproduce observation information onto the land terminal equipment. Thus, the submarine observation system can have high expandability.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1.

Figure 1:
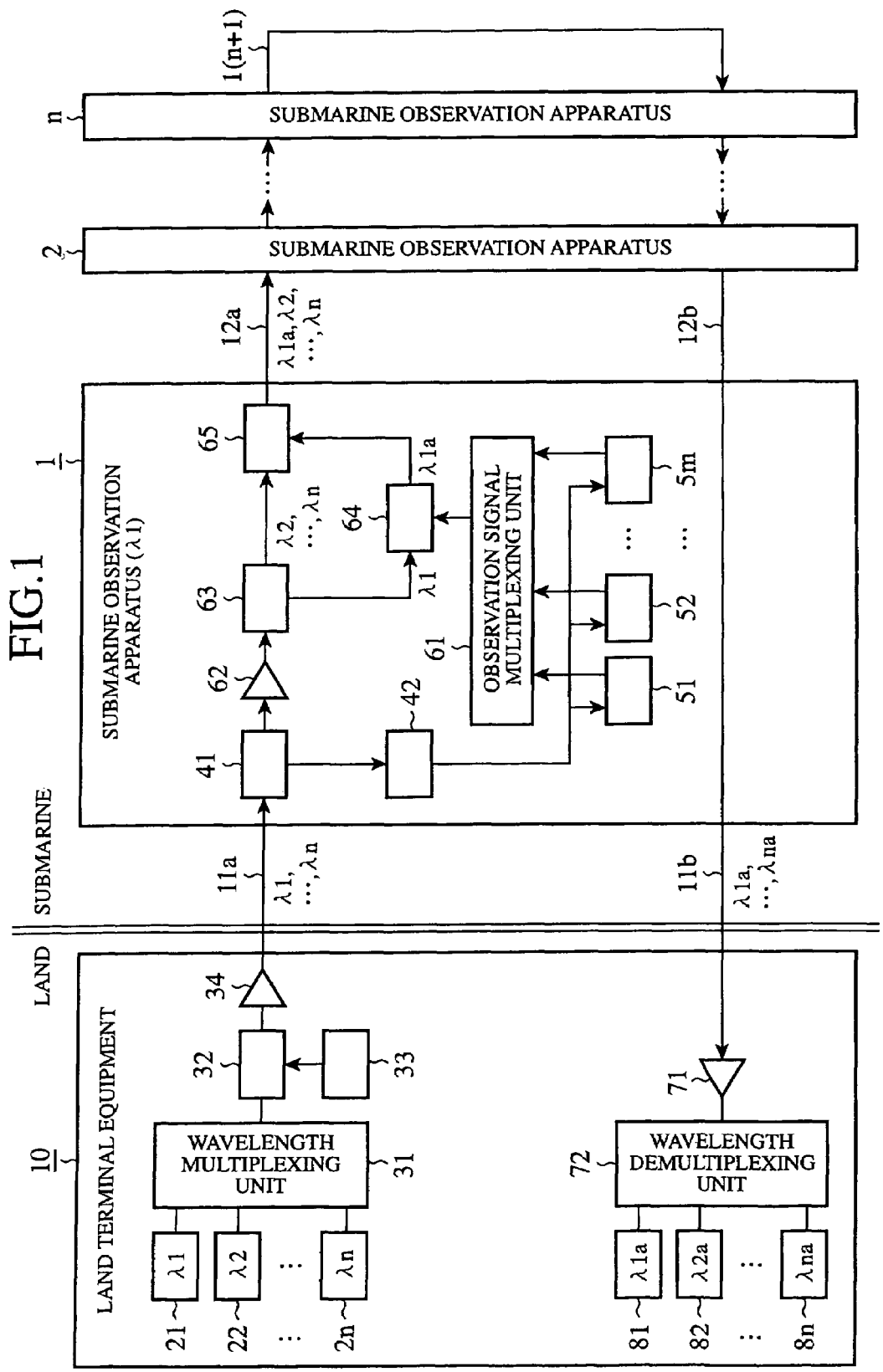
FIG. 1 is a block diagram showing a submarine observation system in accordance with embodiment 1 of the present invention.

FIG. 1 is a block diagram showing a submarine observation system according to embodiment 1 of the present invention. The submarine observation system according to this embodiment 1 transmits multi-wavelength light having different wavelengths, which are respectively assigned in advance to a plurality of submarine observation apparatus, to a submarine optical cable according to a WDM (Wavelength Division Multiplexing) transmission method, and each of the plurality of submarine observation apparatus selectively branches a fixed-wavelength light signal assigned thereto, modulates the fixed-wavelength light signal selectively branched thereby with observation information detected thereby, and combines the modulated, fixed wavelength light signal and other multi-wavelength light signals to generate a composite light signal, and transmits it to land terminal equipment.

In the figure, the plurality of submarine observation apparatus 1 to n respectively placed at submarine observation points are connected to the land terminal equipment (first and second land terminal equipment) 10 placed on land by way of optical fibers (i.e., submarine optical cables) 11a, . . . , 1(n+1), . . . and 11b. The optical fibers include a plurality of pairs, each of which consists of an optical fiber 11a, . . . , or 1na (i.e., a downward line) and an optical fiber 11b, . . . , or 1nb (i.e., an upward line), and the plurality of submarine observation apparatus 1 to n are cascade connected to one another via the plurality of optical fiber pairs. The last-stage submarine observation apparatus n has the optical fiber 1(n+1) which is loopback-connected thereto.

The land terminal equipment 10 includes a plurality of light sources 21 to 2n for respectively generating a plurality of light signals λ1 to λn having different wavelengths, which are respectively assigned in advance to the plurality of submarine observation apparatus 1 to n, and a wavelength multiplexing unit 31 for combining these generated light signals λ1 to λn into a wavelength-multiplexed light signal. A control signal modulating unit 32 modulates the wavelength-multiplexed light signal from the wavelength multiplexing unit 31 with control signals used for controlling sensors included in each of the plurality of submarine observation apparatus 1 to n, which are outputted from a control signal transmitting unit 33. An optical amplification unit 34 amplifies the modulated light signal and transmits it to the optical fiber 11a.

In the submarine observation apparatus 1, a control signal branching unit 41 (i.e., a second branch means) branches a part of the wavelength-multiplexed light signal received by the submarine observation apparatus 1, and a control signal receiving unit (i.e., a demodulation means) 42 demodulates the branched light signal back into generate control signals for respectively controlling sensors (i.e., an observation means) 51 to 5m included in the submarine observation apparatus 1. A pressure gage used for observing tidal waves, a seismometer can be used as the plurality of sensors 51 to 5m for observing submarine environments, for example. The plurality of sensors 51 to 5m are controlled by the generated control signals, respectively. For example, the orientation of a camera is controlled by one of the control signals. An observation signal multiplexing unit 61 multiplexes observation signals obtained by the plurality of sensors 51 to 5m, and monitoring signals indicating the states of circuits or devices used for driving the plurality of sensors 51 to 5m. These multiplexed observation signals and monitoring signals will be referred to as multiplexed observation information from here on.

An optical amplification unit 62 amplifies a remaining part of the incoming wavelength-multiplexed light signal passing through the control signal branching unit 41, and a branching unit (i.e., a first branch means) 63 selectively branches a fixed-wavelength light signal λ1, which is assigned in advance to the submarine observation apparatus 1, from the wavelength-multiplexed light signal input to the submarine observation apparatus 1. An observation signal modulating unit (i.e., a modulating means) 64 modulates the intensity of the branched fixed-wavelength light signal λ1 with the multiplexed observation information, and a combining unit (i.e., a combining means) 65 combines the fixed-wavelength light λ1a modulated by the observation signal modulating unit 64 and a wavelength-multiplexed light signal passing through the branching unit 63 into a multi-wavelength light signal, and outputs it. Each of the remaining submarine observation apparatus 2 to n has the same structure as the submarine observation apparatus 1.

In the land terminal equipment 10, an optical amplification unit 71 amplifies an incoming wavelength-multiplexed light signal transmitted thereto, via the submarine observation apparatus n to 1 and the optical fiber 11b, from the last-stage submarine observation apparatus n, and a wavelength demultiplexing unit 72 demultiplexes the amplified multi-wavelength light signal into light signals λ1a to λna having different wavelengths. A plurality of receivers 81 to 8n then demodulate these light signals λ1a to λna having different wavelengths back into plural pieces of observation information, respectively.

Next, the operation of the submarine observation system in accordance with embodiment 1 of the present invention will be explained.

In the land terminal equipment 10, the plurality of light sources 21 to 2n generate light signals λ1 to λn having different wavelengths, and the wavelength multiplexing unit 31 combines the light signals λ1 to λn having different wavelengths into a wavelength-multiplexed light signal. The control signal modulating unit 32 modulates the wavelength-multiplexed light signal with control signals used for respectively controlling the plurality of sensors 51 to 5m, which are outputted from the control signal transmitting unit 33, and the optical amplification unit 34 amplifies the modulated wavelength-multiplexed light signal and transmits it to the optical fiber 11a.

In the submarine observation apparatus 1, the control signal branching unit 41 branches a part of the modulated wavelength-multiplexed light signal transmitted thereto via the optical fiber 11a, and the control signal receiving unit 42 demodulates the part of the wavelength-multiplexed light signal branched by the control signal branching unit 41 back into the control signals used for respectively controlling the plurality of sensors 51 to 5m. The submarine observation apparatus 1 then controls the plurality of sensors 51 to 5m using these reproduced controls signal. Plural pieces of observation information respectively obtained by the plurality of sensors 51 to 5m are multiplexed by the observation signal multiplexing unit 61.

The optical amplification unit 62 performs amplification comparable as attenuation provided to the incoming wavelength-multiplexed light signal passing through the optical fiber 11a on a remaining part of the wavelength-multiplexed light signal passing through the control signal branching unit 41, and the branching unit 63 branches a fixed-wavelength light signal $\lambda 1$ from the remaining part of the wavelength-multiplexed light signal amplified by the optical amplification unit 62. The observation signal modulating unit 64 modulates the intensity of the fixed-wavelength light signal $\lambda 1$ with observation information multiplexed by the observation signal multiplexing unit 61, and the combining unit 65 combines the wavelength-multiplexed light signals $\lambda 2, \ldots,$ and $\lambda n$ passing through the branching unit 63 and the fixed-wavelength light signal $\lambda 1a$ modulated by the observation signal modulating unit 64 into a composite light signal, and then outputs it to the optical fiber 12a.

The observation signal modulating unit 64 modulates the intensity of the fixed-wavelength light signal $\lambda 1$ using an EDFA gain modulation or Raman modulation method. Each of the EDFA gain modulation and Raman modulation methods can be implemented by modulating the gain of an amplifier by modulating a pump light source. The modulation of the pump light source can be implemented by modulating the driving current of the pump light source.

According to the EDFA gain modulation method, an EDFA is used as the amplifier. This EDFA amplifies incoming light using the stimulated emission from erbium ions which are doped into a fiber (EDF: Erbium Doped Fiber) and excited by the pump light. In the case of using the EDFA gain modulation method, the observation signal modulating unit 64 can modulate the intensity of the fixed-wavelength light signal $\lambda 1$ with a good degree of amplification efficiency and with a small current amplitude.

According to the Raman modulation method, a Raman amplifier is used as the amplifier. This Raman amplifier amplifies incoming light, which is launched into a fiber together with the pump light, using the stimulated Raman scattering process in the optical fiber. In the case of using the Raman modulation method, the observation signal modulating unit 64 can modulate the intensity of the fixed-wavelength light signal $\lambda 1$ at a high speed.

The submarine observation apparatus k ($=2, 3, \ldots,$ or n) branches a light signal $\lambda k$ having a fixed wavelength, which is assigned in advance to the submarine observation apparatus k, from an incoming wavelength-multiplexed light signal, like the submarine observation apparatus 1, and combines the fixed-wavelength light signal $\lambda k$ and other fixed-wavelength light signals $\lambda 1a$ to $\lambda(k-1)a$, and $\lambda(k+1)$ to $\lambda n$ into a composite light signal after modulating the fixed-wavelength light signal $\lambda k$ with observation information obtained thereby, and outputs the composite light signal to the next-stage optical fiber 1(k+1)a.

A wavelength-multiplexed light signal which consists of fixed-wavelength light signals $\lambda 1a$ to $\lambda na$ respectively modulated by the plurality of submarine observation apparatus 1 to n with the plural pieces of observation information respectively obtained by the plurality of submarine observation apparatus 1 to n is sent back to the land terminal equipment 10 by way of the optical fiber 1(n+1) which is loopback-connected to the submarine observation apparatus n, the plurality of submarine observation apparatus n to 1, and the downward optical fibers 1nb to 11b.

In the land terminal equipment 10, the optical amplification unit 71 amplifies the wavelength-multiplexed light signal transmitted thereto via the optical fiber 11b, the wavelength demultiplexing unit 72 demultiplexes the wavelength-multiplexed light signal into a plurality of light signals $\lambda 1a$ to $\lambda na$ having different fixed wavelengths, and the plurality of receivers 81 to 8n demodulate the plurality of light signals $\lambda 1a$ to $\lambda na$ having different fixed wavelengths back into the plural pieces of observation information, respectively.

As previously mentioned, in accordance with this embodiment 1, the optical fiber 1(n+1) is loopback-connected to the submarine observation apparatus n. As an alternative, the optical fiber 1(n+1) can be connected to other land terminal equipment (i.e., second land terminal equipment) without being loopback-connected to the submarine observation apparatus n.

As mentioned above, according to this embodiment 1, each of the plurality of submarine observation apparatus 1 to n is so constructed as to modulate the intensity of a corresponding fixed-wavelength light signal inputted thereto with observation information, combine the fixed-wavelength light signal and a remaining wavelength-multiplexed light signal having different wavelengths into a composite light signal, and output it, so as to transmit the observation information to the land terminal equipment. Therefore, in each of the plurality of submarine observation apparatus 1 to n, there is no necessity for providing a wavelength-division-multiplexing-transmission optical transmitter which requires high wavelength stability. As a result, any increase in the scale and cost of each of the plurality of submarine observation apparatus can be suppressed, and the reliability of each of the plurality of submarine observation apparatus can be improved.

As mentioned above, the submarine observation system according to this embodiment 1 in which the plurality of submarine observation apparatus 1 to n are connected to the land terminal equipment 10 by way of the plurality of optical fibers 11a, ..., 1(n+1), ..., and 11b uses a wavelength division multiplexing (or WDM) transmission method. Therefore, a new submarine observation apparatus can be easily added to the submarine observation system by additionally installing a means for generating a light signal having a wavelength different from those of the light signals wavelength-multiplexed by the wavelength multiplexing unit 31 and for multiplexing these light signals and the generated light signal, and a means for separating and demodulating a light signal having the same wavelength as the newly-generated light signal from a wavelength-multiplexed light signal sent back to the land terminal equipment 10 to reproduce observation information onto the land terminal equipment 10. Thus, the submarine observation system according to this embodiment 1 has high expandability.

In addition, since each of the plurality of submarine observation apparatus 1 to n can acquire control signals used for respectively controlling the plurality of sensors 51 to 5m thereof by branching a part of the incoming light signal by using the control signal branching unit 41 and demodulates the part of the incoming light signal by using the control signal receiving unit 42, the structure of the optical receiver of each of the plurality of submarine observation apparatus 1 to n can be simplified and therefore any increase in the scale and cost of each of the plurality of submarine observation apparatus 1 to n can be suppressed.

Embodiment 2.

Figure 2:
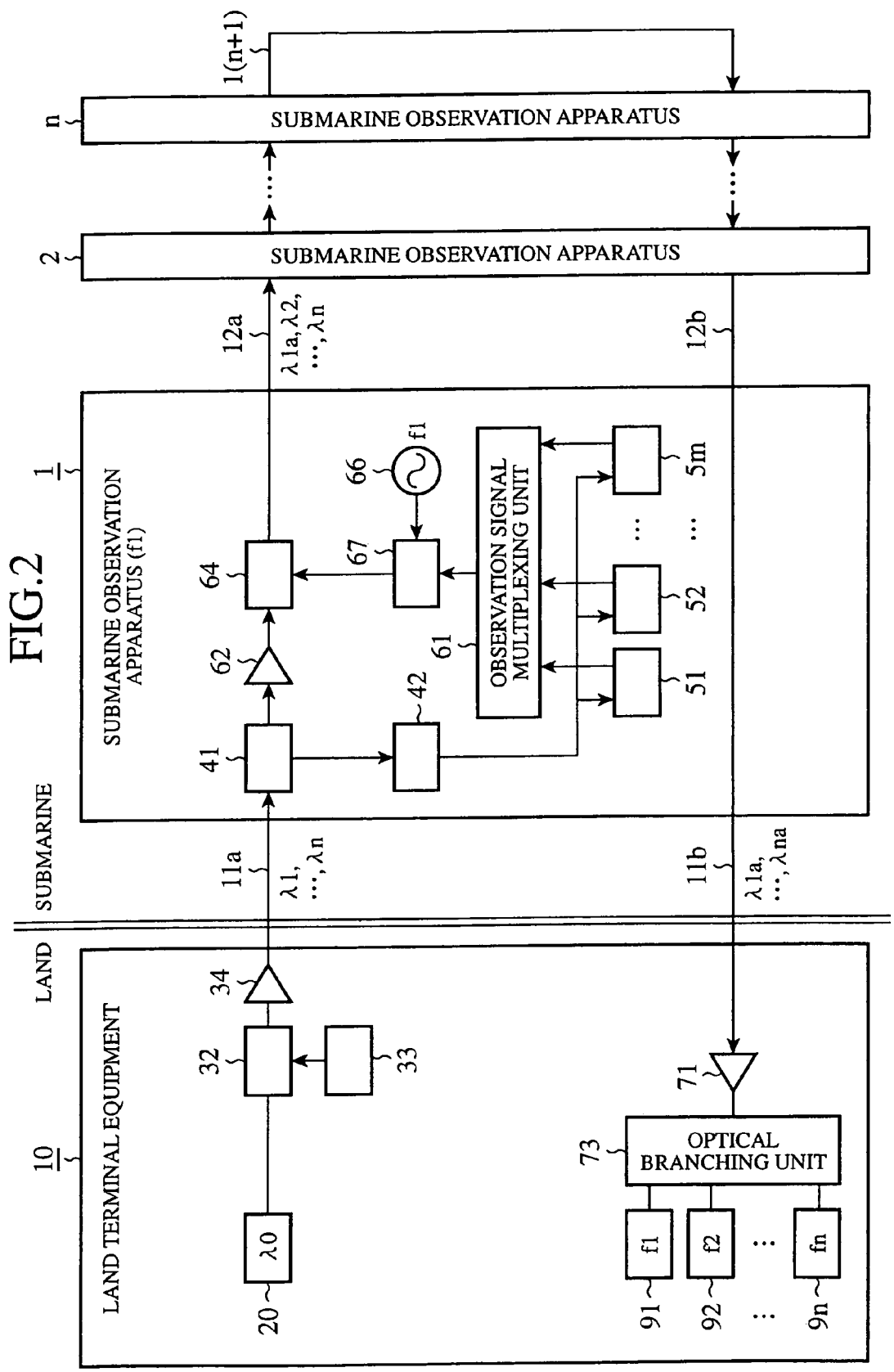
FIG. 2 is a block diagram showing a submarine observation system in accordance with embodiment 2 of the present invention.

FIG. 2 is a block diagram showing a submarine observation system according to embodiment 2 of the present invention. While the submarine observation system according to above-mentioned embodiment 1 uses a WDM transmission method, as previously mentioned, the submarine observation system according to this embodiment 2 uses an optical SCM (Sub Carrier Multiplexing) method. According to this optical SCM method, carrier light from land terminal equipment is transmitted to a submarine optical cable as a light signal, different frequencies are assigned to a plurality of submarine observation apparatus, respectively, a subcarrier having a frequency which is assigned in advance to each of the plurality of submarine observation apparatus is modulated with observation information, the light signal transmitted from the land terminal equipment is further modulated with the subcarrier modulated with the observation information in each of the plurality of submarine observation apparatus, and the modulated light signal is then transmitted to the land terminal equipment.

In the land terminal equipment 10, a light source 20 generates carrier light which is predetermined-wavelength light $\lambda 0$, a control signal modulating unit 32 modulates the carrier light signal from the light source 20 with control signals outputted by a control signal transmitting unit 33, and an optical amplification unit 34 amplifies the modulated light signal and transmits it to an optical fiber 11a.

The submarine observation apparatus 1 has a control signal branching unit 41, a control signal receiving unit 42, a plurality of sensors 51 to 5m, an observation signal multiplexing unit 61, and an optical amplification unit 62 that are the same as those of each of the plurality of submarine observation apparatus according to above-mentioned embodiment 1, respectively.

A subcarrier source (i.e., an oscillating means) 66 generates a signal having a frequency f1 which is assigned in advance to the submarine observation apparatus 1, as a subcarrier. A modulated-signal generating unit (i.e., a first modulation means) 67 modulates the subcarrier having the frequency f1 with observation information multiplexed by the observation signal multiplexing unit 61, and an observation signal modulating unit (i.e., a second modulation means) 64 modulates the intensity of a light signal amplified by the optical amplification unit 62 with the modulated subcarrier wave generated by the modulated-signal generating unit 67, and then outputs the intensity-modulated light signal. Each of the remaining submarine observation apparatus 2 to n has the same structure as the submarine observation apparatus 1.

In the land terminal equipment 10, an optical amplification unit 71 amplifies an incoming light signal transmitted thereto, via the submarine observation apparatus n−1 to 1 and an optical fiber 11b, from the last-stage submarine observation apparatus n, and an optical branching unit 73 separates the amplified light signal into light signals respectively associated with different frequencies f1 to fn. A plurality of receivers 91 to 9n then demodulate these light signals respectively associated with different frequencies f1 to fn back into plural pieces of observation information obtained by the plurality of submarine observation apparatus, respectively.

Next, the operation of the submarine observation system in accordance with embodiment 2 of the present invention will be explained.

In the land terminal equipment 10, the light source 20 generates carrier light which is fixed-wavelength light $\lambda 0$, the control signal modulating unit 32 modulates the carrier light with control signals used for respectively controlling the plurality of sensors 51 to 5m, which are outputted by the control signal transmitting unit 33, and the optical amplification unit 34 amplifies the modulated light signal and transmits it to the optical fiber 11a.

In the submarine observation apparatus 1, the control signal branching unit 41, the control signal receiving unit 42, the plurality of sensors 51 to 5m, the observation signal multiplexing unit 61, and the optical amplification unit 62 operate in the same way as those of the submarine observation apparatus 1 according to above-mentioned embodiment 1.

The subcarrier source 66 generates a subcarrier having a frequency f1, the modulated-signal generating unit 67 modulates the subcarrier having the frequency f1 with observation information multiplexed by the observation signal multiplexing unit 61, and the observation signal modulating unit 64 modulates the intensity of a light signal amplified by the optical amplification unit 62 with the modulated subcarrier wave generated by the modulated-signal generating unit 67, and then outputs the intensity-modulated light signal to an optical fiber 12a.

The observation signal modulating unit 64 modulates the intensity of the light signal using an EDFA gain modulation or Raman modulation method, like that of above-mentioned embodiment 1.

The submarine observation apparatus k (=2, 3, . . . , or n) modulates a subcarrier having a frequency fk which is assigned in advance thereto with observation information, further modulates the intensity of an incoming light signal with the modulated subcarrier wave, and outputs the intensity-modulated light signal to an optical fiber 1(k+1)a connected to the next submarine observation apparatus k+1, like the submarine observation apparatus 1.

The light signal which has been intensity-modulated with the subcarrier waves having the frequencies f1 to fn respectively modulated with the plural pieces of observation information is then sent back to the land terminal equipment 10.

In the land terminal equipment 10, the optical amplification unit 71 amplifies the incoming light signal transmitted thereto, via the optical fiber 11b, from the last-stage submarine observation apparatus n, and the optical branching unit 73 separates the amplified light signal into light signals respectively associated with the different frequencies f1 to fn. The plurality of receivers 91 to 9n then demodulate these light signals respectively associated with different frequencies f1 to fn back into the plural pieces of observation information obtained by the plurality of submarine observation apparatus, respectively.

In accordance with this embodiment 2, an optical fiber 1(n+1) is loopback-connected to the submarine observation apparatus n. As an alternative, the optical fiber 1(n+1) can be connected to other land terminal equipment (i.e., second land terminal equipment) without being loopback-connected to the submarine observation apparatus n.

As mentioned above, according to this embodiment 2, each of the plurality of submarine observation apparatus 1 to n is so constructed as to modulate a subcarrier having a frequency assigned thereto with observation information, further modulate the intensity of an incoming light signal with the modulated subcarrier wave, and output the intensity-modulated light signal so as to transmit observation information to the land terminal equipment. Therefore, in each of the plurality of submarine observation apparatus 1 to n, there is no necessity for providing a wavelength-division-multiplexing-transmission optical transmitter which requires high wavelength stability. As a result, any increase in the scale and cost of each of the plurality of submarine observation apparatus can be suppressed, and the reliability of each of the plurality of submarine observation apparatus can be improved.

As mentioned above, the submarine observation system according to this embodiment 2 in which the plurality of submarine observation apparatus 1 to n are connected to the land terminal equipment 10 by way of the plurality of optical fibers 11a, . . . , 1(n+1), . . . , and 11b uses an optical SCM method. Therefore, a new submarine observation apparatus can be easily added to the submarine observation system by additionally installing a receiver for receiving a light signal associated with a specific frequency sent back to the land terminal equipment 10 to reproduce observation information onto the land terminal equipment 10. Thus, the submarine observation system according to this embodiment 2 has high expandability.

In addition, since each of the plurality of submarine observation apparatus 1 to n can acquire control signals used for respectively controlling the plurality of sensors 51 to 5m thereof by branching a part of the incoming light signal using the control signal branching unit 41 and demodulating the part of the incoming light signal by using the control signal receiving unit 42, the structure of the optical receiver of each of the plurality of submarine observation apparatus 1 to n can be simplified and therefore any increase in the scale and cost of each of the plurality of submarine observation apparatus 1 to n can be suppressed.

Embodiment 3.

Figure 3:
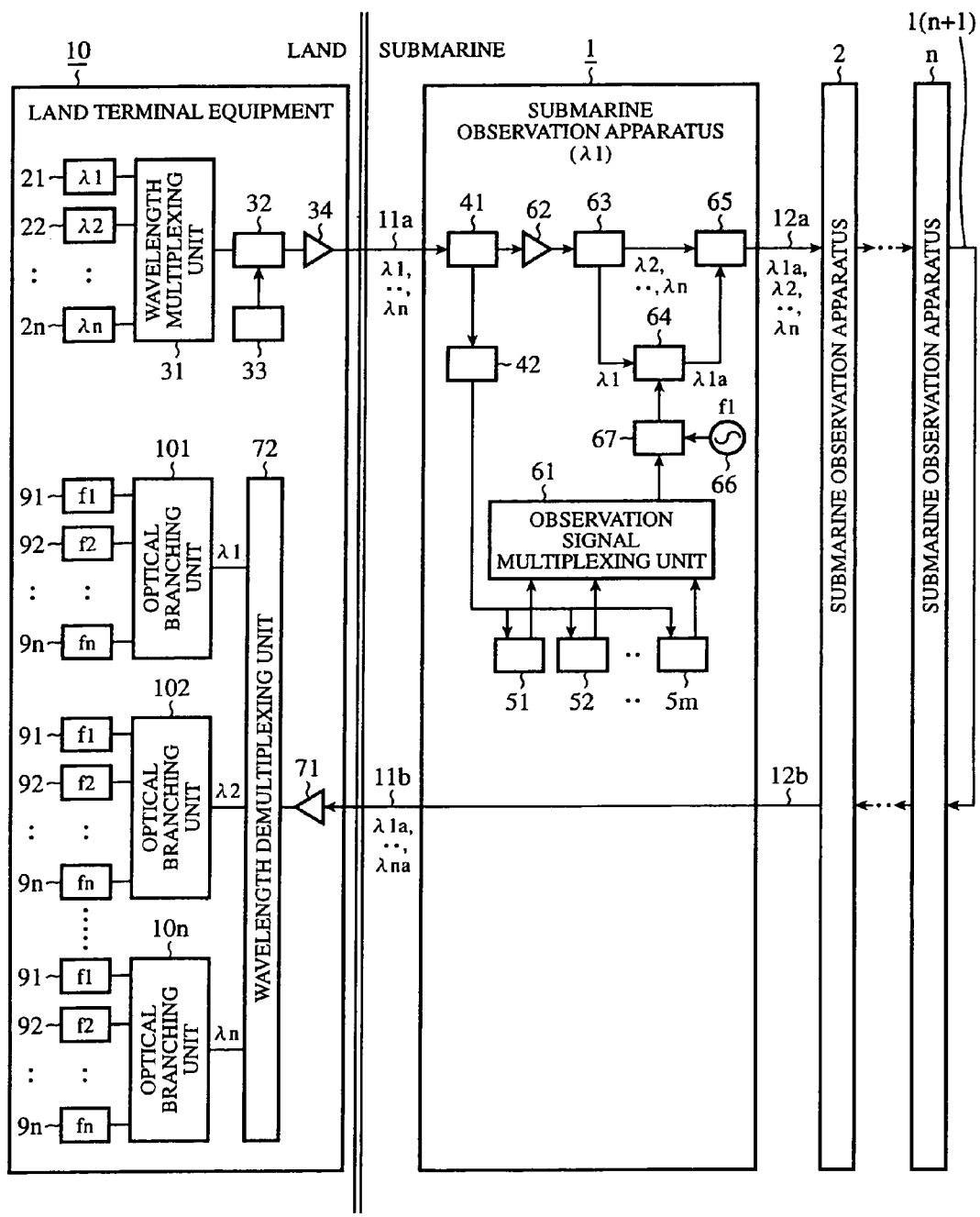
FIG. 3 is a block diagram showing a submarine observation system in accordance with embodiment 3 of the present invention.

FIG. 3 is a block diagram showing a submarine observation system according to embodiment 3 of the present invention. In the submarine observation system according to above-mentioned embodiment 2, the land terminal equipment 10 transmits carrier light $\lambda 0$ having a fixed wavelength to the plurality of submarine observation apparatus 1 to n respectively associated with different frequencies, and each of the plurality of submarine observation apparatus 1 to n modulates a subcarrier having a frequency assigned thereto with observation information, further modulates the intensity of an incoming light signal having the fixed wavelength with the modulated subcarrier wave, and outputs the intensity-modulated light signal so as to transmit observation information. In contrast, the submarine observation system according to this embodiment 3 uses a wavelength division multiplexing transmission method explained in above-mentioned embodiment 1, as well as an optical SCM method explained in above-mentioned embodiment 2, and each of a plurality of submarine observation apparatus modulates the intensity of a light signal having a fixed wavelength assigned in advance thereto with a modulated wave which is obtained by modulating a subcarrier having a fixed frequency assigned in advance thereto with observation information, and transmits the intensity-modulated light signal to land terminal equipment 10.

The land terminal equipment 10 has a plurality of light sources 21 to 2n, a wavelength multiplexing unit 31, a control signal modulating unit 32, a control signal transmitting unit 33, and an optical amplification unit 34 that are the same as those of the land terminal equipment 10 of the submarine observation system according to above-mentioned embodiment 1, respectively.

The submarine observation apparatus 1 has a control signal branching unit 41, a control signal receiving unit 42, a plurality of sensors 51 to 5m, an observation signal multiplexing unit 61, and an optical amplification unit 62 which are the same as those of the submarine observation apparatus 1 according to above-mentioned embodiment 1, respectively.

A subcarrier source 66 generates a subcarrier having a frequency f1 which is assigned in advance to the submarine observation apparatus 1, and a modulated-signal generating unit 67 modulates the subcarrier having the frequency f1 with observation information multiplexed by an observation signal multiplexing unit 61. The subcarrier source 66 and the modulated-signal generating unit 67 are the same as those of the submarine observation apparatus 1 according to above-mentioned embodiment 2, respectively.

A branching unit 63 selectively branches a fixed-wavelength light signal $\lambda 1$, which is assigned in advance to the submarine observation apparatus 1, from an incoming wavelength-multiplexed light signal. An observation signal modulating unit 64 modulates the intensity of the fixed-wavelength light signal $\lambda 1$ with the modulated wave obtained by the modulated-signal generating unit 67, and a combining unit 65 combines a wavelength-multiplexed light signal passing through the branching unit 63 and the fixed-wavelength light signal $\lambda 1a$ modulated by the observation signal modulating unit 64 into a composite light signal, and then outputs it to an optical fiber 12a. The branching unit 63, the observation signal modulating unit 64, and the combining unit 65 are the same as those of the submarine observation apparatus 1 according to above-mentioned embodiment 1, respectively. Each of the remaining submarine observation apparatus 2 to n has the same structure as the submarine observation apparatus 1.

In the land terminal equipment 10, an optical amplification unit 71 amplifies an incoming light signal transmitted thereto, via the submarine observation apparatus n−1 to 1 and an optical fiber 11b, from the last-stage submarine observation apparatus n, and a wavelength demultiplexing unit 72 demultiplexes the amplified light signal into fixed-wavelength light signals $\lambda 1a$ to $\lambda na$ having different wavelengths, and a plurality of optical branching unit 101 to 10n separate the fixed-wavelength light signals $\lambda 1a$ to $\lambda na$ into light signals respectively associated with different frequencies f1 to fn, respectively. A plurality of receivers 91 to 9n then demodulate these light signals respectively associated with different frequencies f1 to fn back into plural pieces of observation information, respectively.

Next, the operation of the submarine observation system in accordance with embodiment 3 of the present invention will be explained.

In the land terminal equipment 10, the plurality of light sources 21 to 2n, the wavelength multiplexing unit 31, the control signal modulating unit 32, the control signal transmitting unit 33, and the optical amplification unit 34 operate in the same way as those of the land terminal equipment 10 of the submarine observation system according to above-mentioned embodiment 1, respectively.

In the submarine observation apparatus 1, the control signal branching unit 41, the control signal receiving unit 42, the plurality of sensors 51 to 5m, the observation signal multiplexing unit 61, and the optical amplification unit 62 operate in the same way as those of the submarine observation apparatus 1 of the submarine observation system according to above-mentioned embodiment 1, respectively.

The subcarrier source 66 produces a subcarrier having a frequency f1, the modulated-signal generating unit 67 modulates the subcarrier having the frequency f1 with observation information multiplexed by the observation signal multiplexing unit 61. The branching unit 63 branches a fixed-wavelength light signal $\lambda 1$ from an incoming wavelength-multiplexed light signal amplified by the optical amplification unit 62. The observation signal modulating unit 64 then modulates the intensity of the fixed-wavelength light signal $\lambda 1$ with the modulated wave obtained by the modulated-signal generating unit 67, and the combining unit 65 combines wavelength-multiplexed light signals λ2, . . . , and λn passing through the branching unit 63 and the fixed-wavelength light signal λ1a modulated by the observation signal modulating unit 64 into a composite light signal, and then outputs it to the optical fiber 12a.

The observation signal modulating unit 64 modulates the intensity of the light signal using an EDFA gain modulation or Raman modulation method, like that of above-mentioned embodiment 1.

The submarine observation apparatus k (=2, 3, . . . , or n) branches a light signal λk having a fixed wavelength, which is assigned in advance to the submarine observation apparatus k, from an incoming wavelength-multiplexed light signal, modulates a subcarrier having a frequency fk which is assigned in advance thereto with observation information, further modulates the intensity of the branched light signal λk with the modulated subcarrier wave, and outputs the intensity-modulated light signal to an optical fiber 1(k+1)a connected to the next submarine observation apparatus k+1, like the submarine observation apparatus 1.

A wavelength-multiplexed light signal which consists of fixed-wavelength light signals λ1a to λna respectively modulated by the plurality of submarine observation apparatus 1 to n with the plural pieces of observation information respectively obtained by the plurality of submarine observation apparatus 1 to n is sent back to the land terminal equipment 10.

In the land terminal equipment 10, the optical amplification unit 71 amplifies an incoming light signal transmitted thereto, via the optical fiber 11b, from the last-stage submarine observation apparatus n, and the wavelength demultiplexing unit 72 demultiplexes the amplified light signal into fixed-wavelength light signals λ1a to λna having different wavelengths, and the plurality of optical branching unit 101 to 10n separate the fixed-wavelength light signals λ1a to λna into light signals respectively associated with different frequencies f1 to fn, respectively. The plurality of receivers 91 to 9n then demodulate these light signals respectively associated with different frequencies f1 to fn back into the plural pieces of observation information, respectively.

In accordance with this embodiment 3, an optical fiber 1(n+1) is loopback-connected to the submarine observation apparatus n. As an alternative, the optical fiber 1(n+1) can be connected to other land terminal equipment (i.e., second land terminal equipment) without being loopback-connected to the submarine observation apparatus n.

In accordance with this embodiment 3, the wavelength λk and the frequency fk are assigned in advance to the submarine observation apparatus k, as previously mentioned. As an alternative, an arbitrary combination of a wavelength and a frequency can be assigned in advance to each of the plurality of submarine observation apparatus as long as they are different from those of any other combination which are assigned in advance to any other one of the plurality of submarine observation apparatus.

As mentioned above, according to this embodiment 3, each of the plurality of submarine observation apparatus 1 to n is so constructed as to modulate a subcarrier having a frequency assigned in advance thereto with observation information, further modulate the intensity of an incoming fixed-wavelength light signal having a wavelength assigned in advance thereto with the modulated subcarrier wave, combine the intensity-modulated fixed-wavelength light signal and a remaining wavelength-multiplexed light signal having different wavelengths into a composite light signal, and output it so as to transmit observation information to the land terminal equipment. Therefore, in each of the plurality of submarine observation apparatus 1 to n, there is no necessity for providing a wavelength-division-multiplexing-transmission optical transmitter which requires high wavelength stability. As a result, any increase in the scale and cost of each of the plurality of submarine observation apparatus can be suppressed, and the reliability of each of the plurality of submarine observation apparatus can be improved.

As mentioned above, the submarine observation system according to this embodiment 3 in which the plurality of submarine observation apparatus 1 to n are connected to the land terminal equipment 10 by way of the plurality of optical fibers 11a, . . . , 1(n+1), . . . , and 11b uses a wavelength division multiplexing (or WDM) transmission method and an optical SCM method. Therefore, a new submarine observation apparatus can be easily added to the submarine observation system by additionally installing a means for generating a light signal having a wavelength different from those of the light signals wavelength-multiplexed by the wavelength multiplexing unit 31 and for multiplexing these light signals and the generated light signal, and a means for separating and demodulating a light signal having the same wavelength as the newly-generated light signal from a wavelength-multiplexed light signal sent back to the land terminal equipment 10 and receivers for receiving a light signal associated with a specific frequency sent back to the land terminal equipment 10 to reproduce observation information onto the land terminal equipment 10. Thus, the submarine observation system according to this embodiment 3 has high expandability.

In addition, since each of the plurality of submarine observation apparatus 1 to n can acquire control signals used for respectively controlling the plurality of sensors 51 to 5m thereof by branching a part of the incoming light signal using the control signal branching unit 41 and demodulating the part of the incoming light signal by using the control signal receiving unit 42, the structure of the optical receiver of each of the plurality of submarine observation apparatus 1 to n can be simplified and therefore any increase in the scale and cost of each of the plurality of submarine observation apparatus 1 to n can be suppressed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A submarine observation apparatus, comprising:
   an observation unit configured to observe a submarine environment;
   a control signal branching unit configured to branch a part of a wavelength-multiplexed light signal which includes control signals to control the observation unit;
   an optical amplification unit configured to amplify the wavelength-multiplexed light signal input thereto;
   a first branching unit configured to branch amplified fixed-wavelength light, which is assigned to said submarine observation apparatus, from the amplified wavelength-multiplexed light signal input thereto;
   a modulating unit configured to modulate an intensity of said amplified fixed-wavelength light branched by said first branching unit with observation information observed by said observation unit; and
   a combining unit configured to combine the amplified wavelength-multiplexed light signal passing through said first branching unit and the amplified fixed-wavelength light modulated by said modulating unit into a composite light signal, and configured to output the composite light signal.

2. The submarine observation apparatus according to claim 1, wherein said modulating unit modulates the intensity of said amplified fixed-wavelength light branched by said first branching unit using an EDFA gain modulation method.

3. The submarine observation apparatus according to claim 1, wherein said modulating unit modulates the intensity of said amplified fixed-wavelength light branched by said first branching unit using a Raman modulation method.

4. A submarine observation apparatus, comprising:
an observation unit configured to observe a submarine environment;
a control signal branching unit configured to branch a part of a light signal which includes control signals to control the observation unit;
an optical amplification unit configured to amplify the light signal input thereto;
an oscillating unit configured to generate a carrier wave having a frequency assigned to said submarine observation apparatus;
a first modulating unit configured to modulate the carrier wave generated by said oscillating unit with observation information observed by said observation unit; and
a second modulating unit configured to modulate an intensity of the amplified light signal input thereto according to the modulated carrier wave obtained by said first modulating unit.

5. The submarine observation apparatus according to claim 4, wherein said second modulating unit modulates the intensity of said amplified light signal using an EDFA gain modulation method.

6. The submarine observation apparatus according to claim 4, wherein said second modulating unit modulates the amplified light signal using a Raman modulation method.

7. A submarine observation apparatus, comprising:
an observation unit configured to observe a submarine environment;
a control signal branching unit configured to branch a part of a wavelength-multiplexed light signal which includes control signals to control the observation unit;
an optical amplification unit configured to amplify the wavelength-multiplexed light signal input thereto;
an oscillating unit configured to generate a carrier wave having a frequency assigned to said submarine observation apparatus;
a first modulating unit configured to modulate the carrier wave generated by said oscillating unit with observation information observed by said observation unit;
a first branching unit configured to selectively branch amplified fixed-wavelength light, which is assigned to said submarine observation apparatus, from the amplified wavelength-multiplexed light signal input thereto;
a second modulating unit configured to modulate an intensity of the amplified fixed-wavelength light branched by said first branching unit with the modulated carrier wave obtained by said first modulating unit; and
a combining unit configured to combine the amplified wavelength-multiplexed light signal passing through said first branching unit and the amplified fixed-wavelength light modulated by said second modulating unit into a composite light signal, and configured to output the composite light signal.

8. The submarine observation apparatus according to claim 7, wherein said second modulating unit modulates the intensity of said amplified fixed-wavelength light branched by said first branching unit using an EDFA gain modulation method.

9. The submarine observation apparatus according to claim 7, wherein said second modulating unit modulates the intensity of said amplified fixed-wavelength light branched by said first branching unit using a Raman modulation method.

10. A submarine observation system, comprising:
first land terminal equipment configured to wavelength-multiplex light signals having different wavelengths, which are respectively assigned to a plurality of submarine observation apparatuses connected thereto, into a wavelength-multiplexed light signal, and configured to transmit the wavelength-multiplexed light signal;
a plurality of submarine observation apparatuses which are cascade-connected to said first land terminal equipment by way of submarine optical cables, each of said plurality of submarine observation apparatuses including an observation unit configured to observe a submarine environment, a control signal branching unit configured to branch a part of a wavelength-multiplexed light signal which includes control signals to control the observation unit, an optical amplification unit configured to amplify the wavelength-multiplexed light signal input thereto, a first branching unit configured to branch amplified fixed-wavelength light, which is assigned to said submarine observation apparatus, from the amplified wavelength-multiplexed light signal input thereto, a modulating unit configured to modulate an intensity of said amplified fixed-wavelength light branched by said first branching unit with observation information observed by said observation unit, and a combining unit configured to combine the amplified wavelength-multiplexed light signal passing through said first branching unit and the amplified fixed-wavelength light modulated by said modulating unit into a composite light signal, and for outputting the composite light signal; and
second land terminal equipment configured to separate a light signal from a last-stage one of said plurality of submarine observation apparatuses into light signals having different wavelengths, and configured to demodulate each of said light signals back into observation information.

11. The submarine observation system according to claim 10, wherein
said first land terminal equipment is configured to transmit the light signal to said plurality of submarine observation apparatuses after modulating the light signal with the control signals used to control said observation unit of said plurality of submarine observation apparatuses, and
each of the plurality of submarine observation apparatuses includes a demodulating unit configured to demodulate the part of the light signal branched by said control signal branching unit back into the control signals to control said observation unit of each of the plurality of submarine observation apparatuses.

12. A submarine observation system, comprising:
first land terminal equipment configured to transmit a light signal;
a plurality of submarine observation apparatuses which are cascade-connected to said first land terminal equipment by way of submarine optical cables, each of said plurality of submarine observation apparatuses including an observation unit configured to observe a submarine environment, a control signal branching unit configured to branch a part of a light signal which includes control signals to control the observation unit, an optical amplification unit configured to amplify the light signal input thereto, an oscillating unit configured to generate a carrier wave having a frequency assigned to said submarine observation apparatus, a first modulating unit configured to modulate the carrier wave generated by said oscillating unit with observation information observed by said observation unit, and a second modulating unit configured to modulate an intensity of the amplified light signal input thereto with the modulated carrier wave obtained by said first modulating unit; and second land terminal equipment configured to separate a light signal from a last-stage one of said plurality of submarine observation apparatuses into light signals respectively associated with different frequencies, and configured to demodulate each of said light signals respectively associated with the different frequencies back into observation information.

13. The submarine observation system according to claim 12, wherein said first land terminal equipment is configured to transmit the light signal to said plurality of submarine observation apparatuses after modulating the light signal with the control signals used to control said observation unit of said plurality of submarine observation apparatuses, and each of the plurality of submarine observation apparatuses includes a demodulating unit configured to demodulate the part of the light signal branched by said control signal branching unit back into the control signals to control said observation unit of each of the plurality of submarine observation apparatuses.

14. A submarine observation system, comprising:

first land terminal equipment configured to wavelength-multiplex light signals having different wavelengths, which are respectively assigned to a plurality of submarine observation apparatuses connected thereto, into a wavelength-multiplexed light signal, and configured to transmit the wavelength-multiplexed light signal;

a plurality of submarine observation apparatuses which are cascade-connected to said first land terminal equipment by way of submarine optical cables, each of said plurality of submarine observation apparatuses including an observation unit configured to observe a submarine environment, a control signal branching unit configured to branch a part of a wavelength-multiplexed light signal which includes control signals to control the observation unit, an optical amplification unit configured to amplify the wavelength-multiplexed light signal input thereto, an oscillating unit configured to generate a carrier wave having a frequency assigned to said submarine observation apparatus, a first modulating unit configured to modulate the carrier wave generated by said oscillating unit with observation information observed by said observation unit, a first branching unit configured to selectively branch amplified fixed-wavelength light, which is assigned to said submarine observation apparatus, from the amplified wavelength-multiplexed light signal input thereto, a second modulating unit configured to modulate an intensity of the amplified fixed-wavelength light branched by said first branching unit with the modulated carrier wave obtained by said first modulating unit, and a combining unit configured to combine the amplified wavelength-multiplexed light signal passing through said first branching unit and the amplified fixed-wavelength light modulated by said second modulating unit into a composite light signal, and configured to output the composite light signal; and second land terminal equipment configured to separate a light signal from a last-stage one of said plurality of submarine observation apparatuses into light signals having different wavelengths, configured to further separate each of said light signals into light signals respectively associated with different frequencies, and configured to demodulate each of said light signals respectively associated with the different frequencies back into observation information.

15. The submarine observation system according to claim 14, wherein said first land terminal equipment is configured to transmit the light signal to said plurality of submarine observation apparatuses after modulating the light signal with the control signals used to control said observation unit of said plurality of submarine observation apparatuses, and each of the plurality of submarine observation apparatuses includes a demodulating unit configured to demodulate the part of the light signal branched by said control signal branching unit back into the control signals to control said observation unit of each of the plurality of submarine observation apparatuses.

* * * * *